(12) United States Patent
Matsuyama et al.

(10) Patent No.: US 10,635,107 B2
(45) Date of Patent: Apr. 28, 2020

(54) AUTONOMOUS TRAVELLING VEHICLE

(71) Applicant: Sharp Kabushiki Kaisha, Sakai, Osaka (JP)

(72) Inventors: Kazuhiro Matsuyama, Sakai (JP); Kazuhisa Yoneda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 313 days.

(21) Appl. No.: 15/491,411

(22) Filed: Apr. 19, 2017

(65) Prior Publication Data

US 2017/0315552 A1 Nov. 2, 2017

(30) Foreign Application Priority Data

May 2, 2016 (JP) .................... 2016-092568

(51) Int. Cl.
| | |
|---|---|
| *B60K 28/02* | (2006.01) |
| *G05D 1/00* | (2006.01) |
| *H01Q 21/28* | (2006.01) |
| *B60Q 1/04* | (2006.01) |
| *B60R 11/04* | (2006.01) |
| *G03B 17/56* | (2006.01) |
| *G03B 29/00* | (2006.01) |
| *H01Q 1/32* | (2006.01) |

(52) U.S. Cl.
CPC ............. *G05D 1/0088* (2013.01); *B60Q 1/04* (2013.01); *B60R 11/04* (2013.01); *G03B 17/561* (2013.01); *G03B 29/00* (2013.01); *H01Q 1/3275* (2013.01); *H01Q 21/28* (2013.01); *B60R 2300/105* (2013.01); *B60R 2300/301* (2013.01); *B60R 2300/304* (2013.01); *B60R 2300/80* (2013.01); *G05D 2201/0212* (2013.01)

(58) Field of Classification Search
CPC ................... B60Q 1/04; G05D 1/0088; G05D 2201/0212; G03B 29/00; G03B 17/561; H01Q 1/3275; H01Q 21/28; B60R 11/04; B60R 2300/301; B60R 2300/105; B60R 2300/80; B60R 2300/304
USPC ....................................................... 180/271
See application file for complete search history.

(56) References Cited

U.S. PATENT DOCUMENTS

| | | | |
|---|---|---|---|
| 3,602,088 A * | 8/1971 | Spring ...................... | F41A 9/34 359/402 |
| 4,706,120 A | 11/1987 | Slaughter et al. | |
| 8,833,232 B1 * | 9/2014 | Fox ......................... | F41A 27/18 89/41.06 |
| 8,918,213 B2 * | 12/2014 | Rosenstein .............. | B25J 5/007 700/245 |
| 9,478,064 B2 * | 10/2016 | Bosscher ................ | G06T 15/20 |
| 9,523,548 B2 * | 12/2016 | Fox ......................... | F41A 27/18 |
| 10,233,615 B2 * | 3/2019 | Yamaguchi ............ | H04N 7/181 |

(Continued)

FOREIGN PATENT DOCUMENTS

| | | |
|---|---|---|
| GB | 2 053 516 A | 2/1981 |
| JP | 62-229306 A | 10/1987 |

(Continued)

*Primary Examiner* — Toan C To
(74) *Attorney, Agent, or Firm* — Keating & Bennett, LLP

(57) ABSTRACT

An autonomous travelling vehicle provided with an elevation apparatus on a chassis includes Wi-Fi antennas and cellular antennas that are columnar antennas and that are stood adjacent to an area for elevational motions of an elevation mechanism of the elevation apparatus.

13 Claims, 11 Drawing Sheets

(56) References Cited

U.S. PATENT DOCUMENTS

2015/0114149 A1    4/2015  Gomi et al.
2018/0092304 A1*   4/2018  Moore .................... B25J 5/007
2019/0039856 A1*   2/2019  Summer .............. B25J 11/0025

FOREIGN PATENT DOCUMENTS

| JP | 05-225470 A   | 9/1993  |
|----|---------------|---------|
| JP | 05-328509 A   | 12/1993 |
| JP | 08-143297 A   | 6/1996  |
| JP | 09-300252 A   | 11/1997 |
| JP | 2004-353849 A | 12/2004 |
| JP | 2015-085406 A | 5/2015  |

* cited by examiner

AUTONOMOUS TRAVELLING VEHICLE

BACKGROUND

1. Field

The present disclosure relates to an autonomous travelling vehicle provided with an elevation apparatus.

2. Description of the Related Art

Conventionally, a moving guard robot has been known that autonomously travels in a facility to be guarded, that sends an alarm to outside when detecting an abnormality such as an intruder and a fire in the facility to be guarded, and that then turns toward an object with the abnormality to take measures such as taking pictures of the intruder and extinguishing the fire (see Japanese Unexamined Patent Application Publication No. 5-225470, for instance).

An elevation apparatus installed on a vehicle has been proposed that raises and lowers a work stand with use of a parallel link mechanism which includes a lower boom and an upper boom and which is provided on a vehicle body, by making the lower boom pivot relative to the vehicle body (see Japanese Unexamined Patent Application Publication No. 8-143297, for instance).

For guarding and monitoring with use of an autonomous travelling vehicle, monitoring based on images from a plurality of monitoring cameras is effective. In addition, sounds may be monitored with use of a sound concentrating microphone. A configuration in which such monitoring cameras can be displaced in position relative to the vehicle body by an elevation apparatus helps effective monitoring because images or sounds in a wide area in surroundings of the vehicle body can be picked up.

There is a fear that an object may inadvertently be moved closer to the autonomous travelling vehicle that is moving. Therefore, increase in spacing between the vehicle body and the elevation apparatus can be thought in order that fingers or a foreign object may not get caught between the vehicle body and the elevation apparatus in case of such approach as insertion of the fingers or the foreign object into underside of the elevation apparatus that is in a lowering motion.

It has been difficult, however, to take measures against such a defect related to a catch of a foreign object, because some sites where sufficient spacing between the vehicle body and the elevation apparatus is not allowed exist due to structures of actuators of the elevation apparatus and the vehicle body.

It is desirable to provide an autonomous travelling vehicle that is resistant to a catch of a foreign object between a vehicle body and an elevation apparatus.

SUMMARY

An autonomous travelling vehicle according to the disclosure for settling the problem described above is as follows.

According to an aspect of the disclosure, there is provided an autonomous travelling vehicle provided with an elevation apparatus on a vehicle body, the autonomous travelling vehicle including columnar members stood adjacent to an area for elevational motions of the elevation apparatus.

DESCRIPTION OF THE EMBODIMENTS

First Embodiment

Hereinbelow, embodiments of an autonomous travelling vehicle of the disclosure on which an elevation apparatus is installed will be described with reference to drawings.

Figure 1:
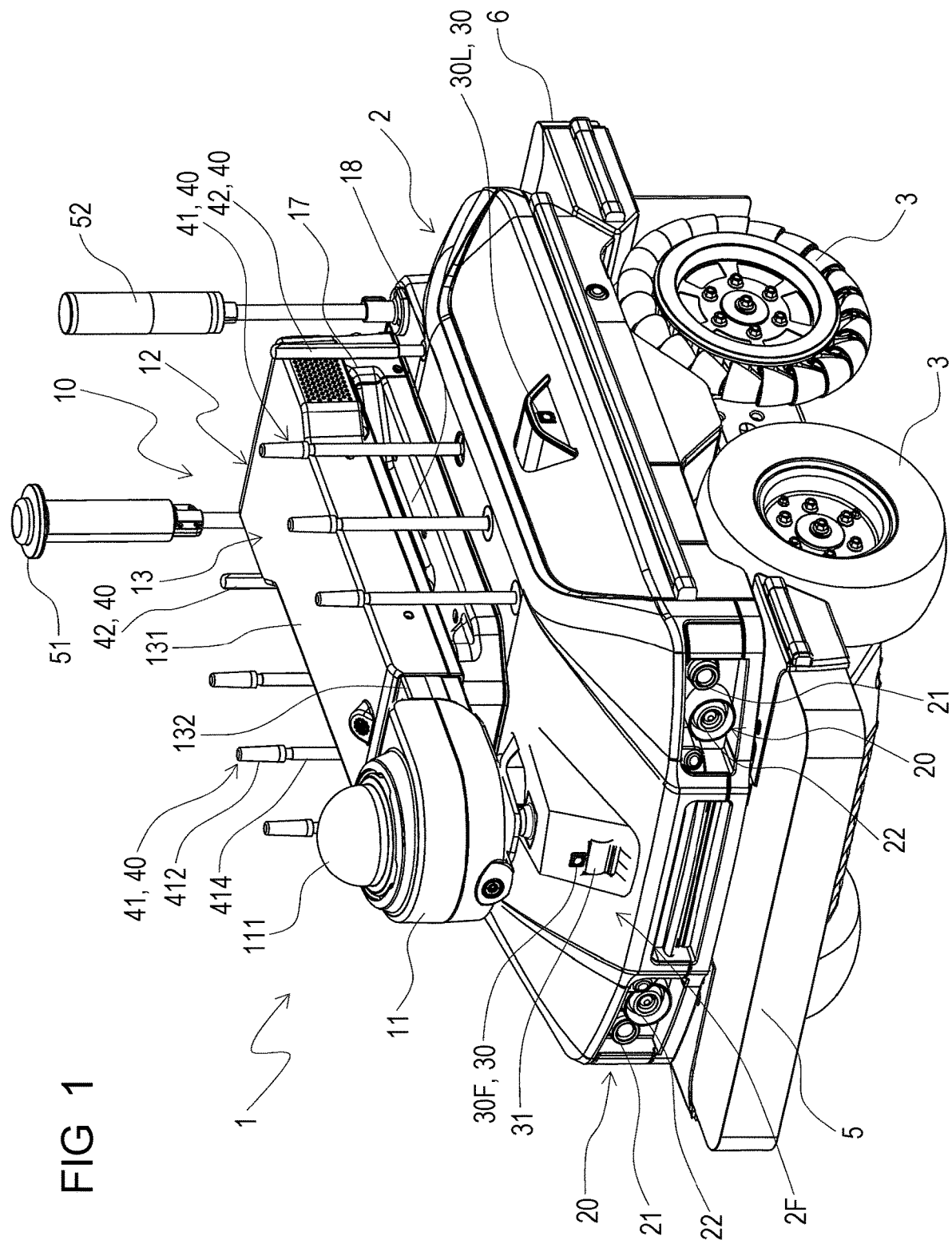
FIG. 1 is an illustration in perspective view that illustrates a general configuration of an autonomous travelling vehicle according to a first embodiment of the disclosure.
Figure 2:
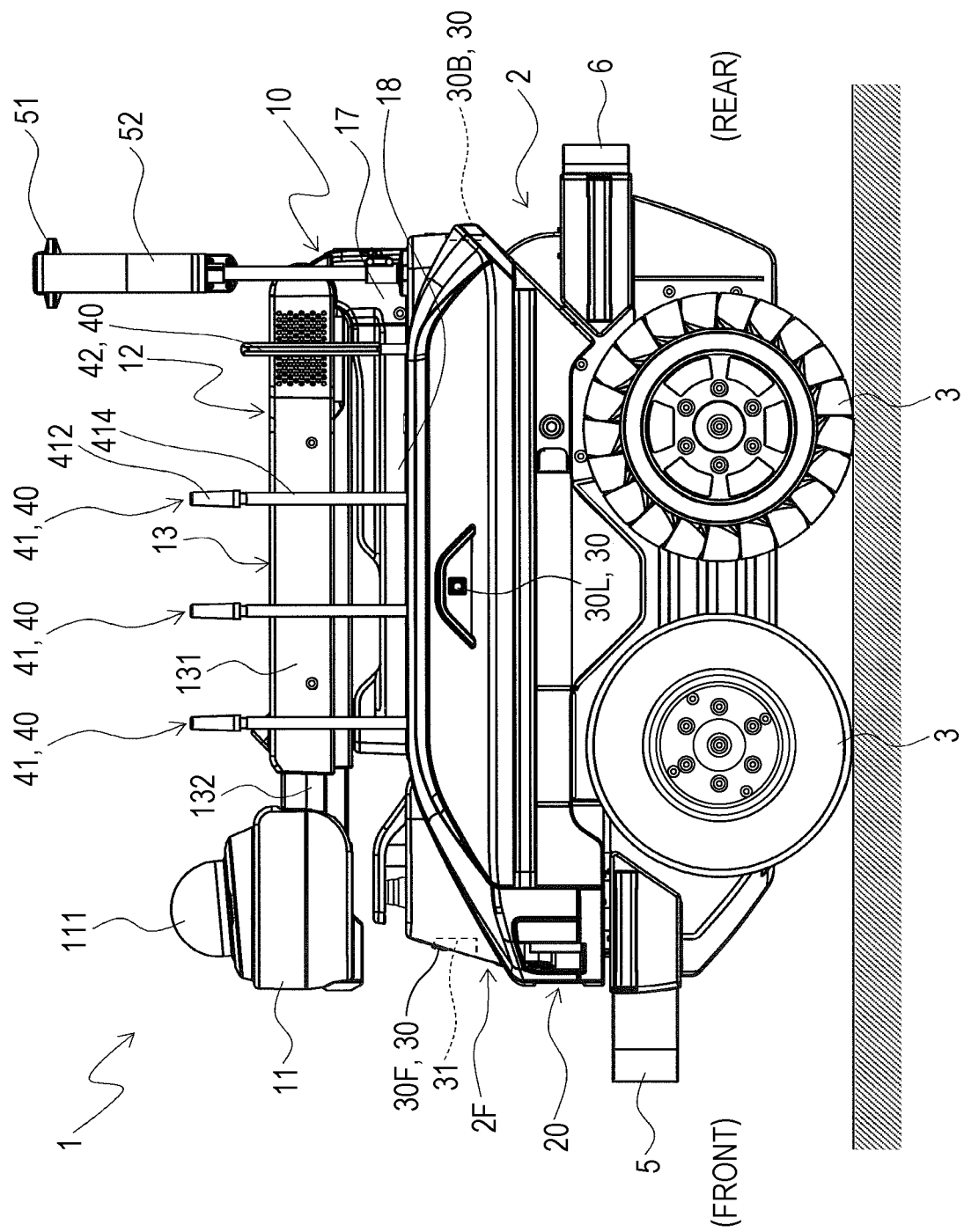
FIG. 2 is an illustration in side view that illustrates the general configuration of the autonomous travelling vehicle.
Figure 3:
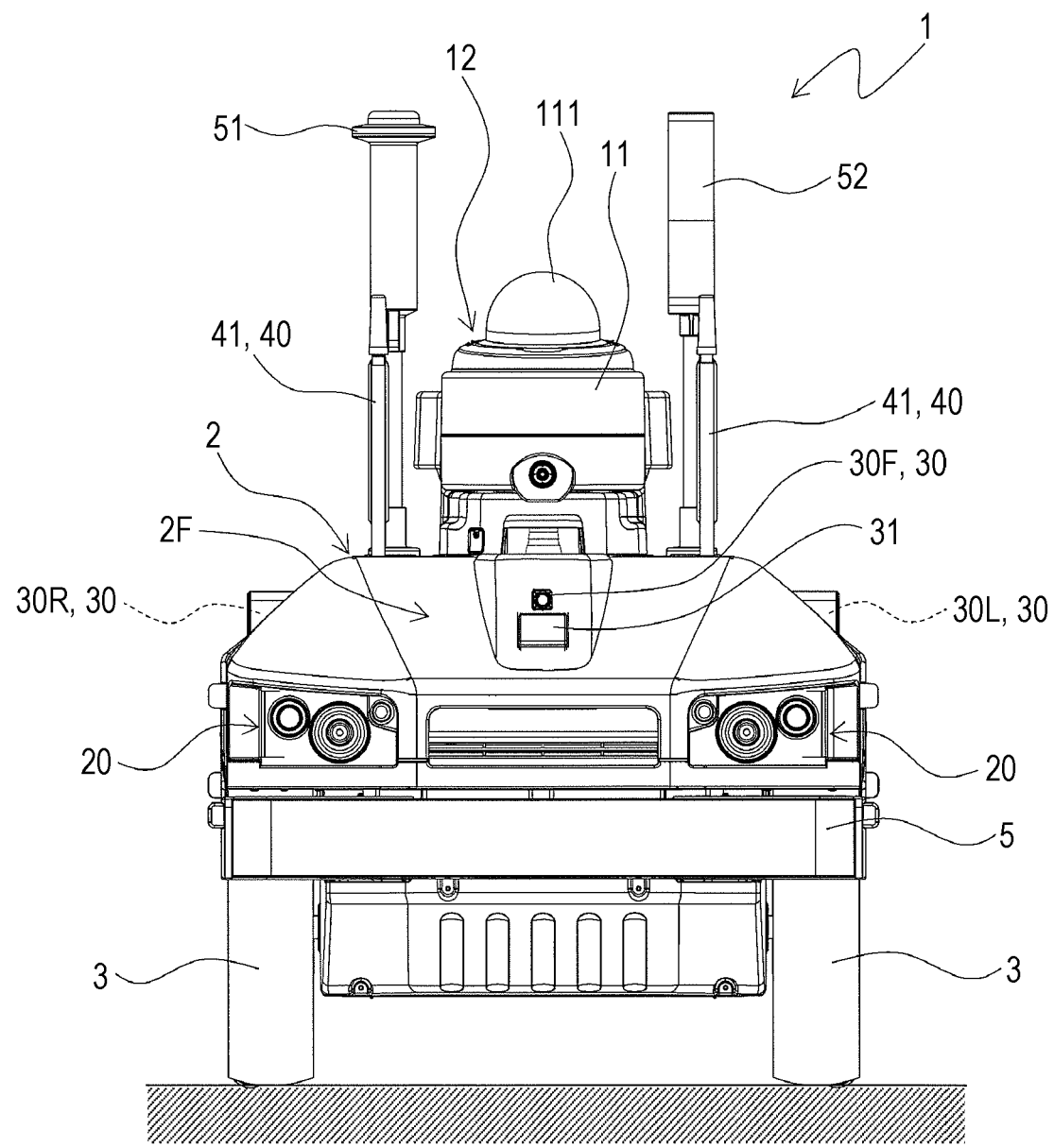
FIG. 3 is an illustration in front view that illustrates the general configuration of the autonomous travelling vehicle.

FIG. 1 is an illustration in perspective view that illustrates a general configuration of an autonomous travelling vehicle according to a first embodiment of the disclosure which is an example of an embodiment of the disclosure. FIG. 2 is an illustration in side view that illustrates the general configuration of the autonomous travelling vehicle. FIG. 3 is an illustration in front view that illustrates the general configuration of the autonomous travelling vehicle.

The autonomous travelling vehicle 1 according to the first embodiment is provided with an elevation apparatus 10 and includes wheels 3 provided on a chassis 2 and columnar antennas (columnar members) 40 stood adjacent to an area for elevational motions of the elevation apparatus 10 on the chassis 2, as illustrated in FIG. 1.

Herein, an autonomous travelling vehicle means an apparatus that autonomously travels based on machines or programs without human decision. As such autonomous travelling vehicles, industrial autonomous transporter vehicles that transport objects in plants, vehicles for guarding, and the like are known, for instance.

The autonomous travelling vehicle 1 of the first embodiment includes the four wheels 3 on the rectangular chassis 2 and each pair of the wheels 3 that is placed along a longitudinal direction (front-rear direction) of the chassis 2 is driven by an electric motor (illustration is omitted) that is a common power source.

In the autonomous travelling vehicle 1, the wheels 3 on a left side and the wheels 3 on a right side can independently be driven and controlled. Thus a travelling direction of the autonomous travelling vehicle 1 can be changed in accordance with a rotational difference between the wheels 3 on the left side and the wheels 3 on the right side. Besides, stationary turning of so-called skid-steer manner in which turning is carried out on a fixed site is enabled by making rotation directions of the wheels 3 on the left side and the wheels 3 on the right side opposite.

As illustrated in FIG. 1, the elevation apparatus 10 includes an elevation mechanism 12 that raises and lowers an elevation unit 11 and a drive unit 17 that drives the elevation mechanism 12.

The elevation unit 11 is provided with a monitoring device 111 including a camera.

The drive unit 17 is fixed to a base 18 placed on an upper part of the chassis 2 of the autonomous travelling vehicle 1.

The base 18 is configured so as to be positioned substantially in parallel with an upper part of the elevation mechanism 12 in a state in which the elevation mechanism 12 is lowered.

The elevation apparatus 10 may be configured as an integrated unit structure including the base 18 and may be detachably attached to the chassis 2.

The elevation mechanism 12 includes a boom 13 connected to the elevation unit 11.

The boom 13 can be made to pivot in vertical directions by the drive unit 17 so as to raise and lower the elevation unit 11 in the vertical directions. The boom 13 includes a first boom member 131 and a second boom member 132. The first boom member 131 can be made to pivot in the vertical directions and the second boom member 132 can be extended and retracted with respect to the first boom member 131.

On a front side and a rear side of the chassis 2, bumpers 5 and 6 are provided so as to extend along an overall width of a vehicle body.

On the chassis 2, as illustrated in FIGS. 2 and 3, monitoring cameras 30 (30F, 30L (30R), and 30B) that respectively monitor (take pictures of) front, left and right, and rear of the vehicle are provided.

A position information detector 51 and an operation display lamp 52 are provided on a rear part of the chassis 2.

In proximity of a center part of a vehicle body front face 2F on the chassis 2, a laser imaging detection and ranging (LIDAR) sensor 31 is provided in addition to the monitoring camera 30F.

The LIDAR sensor 31 detects an object at a long distance by laser radiation in order to analyze the distance to the object and to analyze the object.

The autonomous travelling vehicle 1 detects an obstacle (or a suspicious object or a suspicious person) on a travel route by comparison between images obtained by the monitoring cameras 30 or the LIDAR sensor 31 and background images of the travel route.

Irradiation lamps 20 are provided on left and right sides on the vehicle body front face 2F on the chassis 2.

The monitoring camera 30F and the LIDAR sensor 31 are provided as monitoring devices on the center part of the vehicle body front face 2F.

The irradiation lamps 20 include headlights (light radiating units) 21 that irradiate the front of the vehicle and spotlights (beam lights) 22 for threat irradiation.

Subsequently, characteristic configurations of the autonomous travelling vehicle 1 of the first embodiment will be described with reference to drawings.

Figure 4:
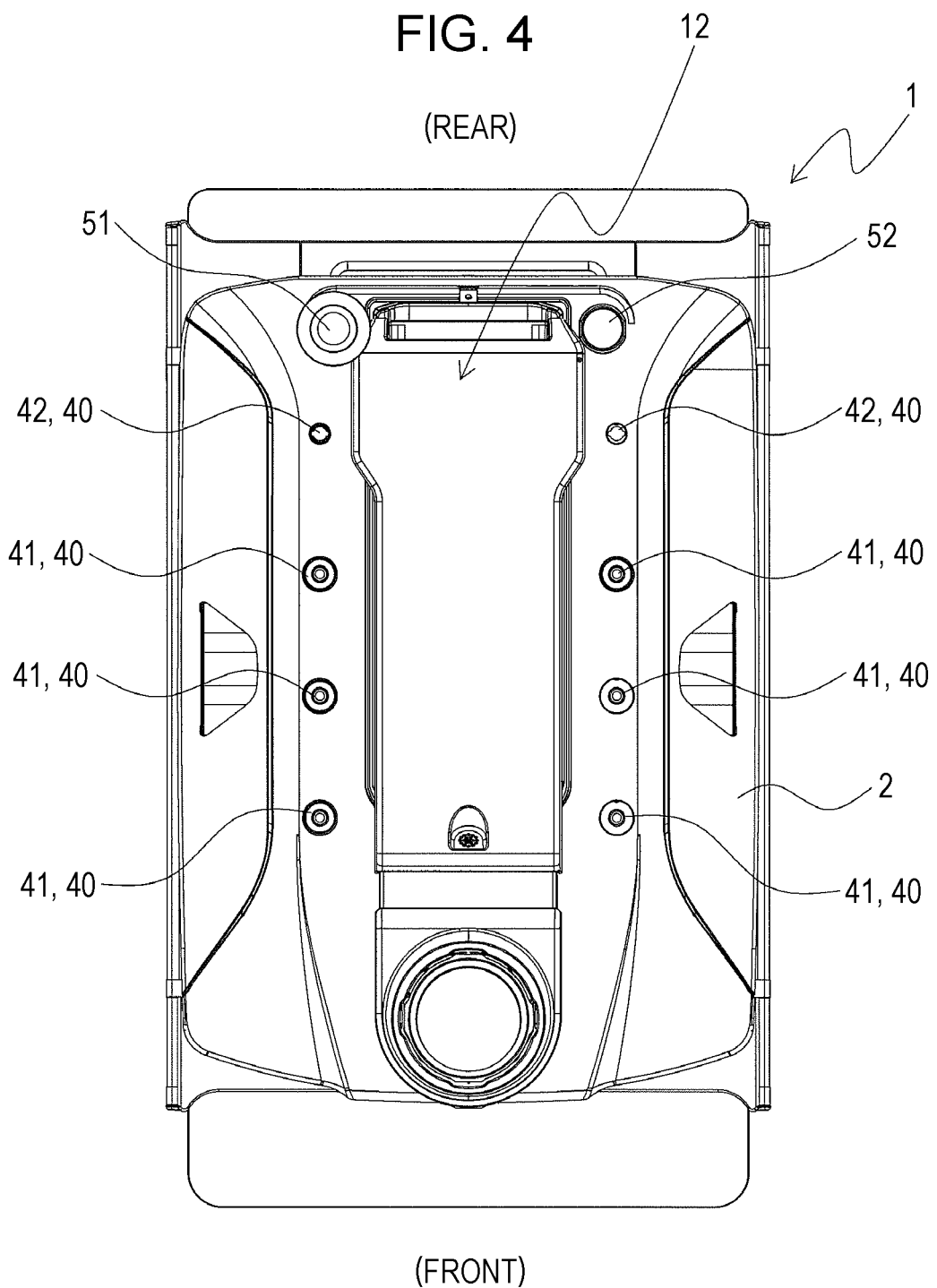
FIG. 4 is an illustration in plan view that illustrates installation positions of columnar antennas on the autonomous travelling vehicle.
Figure 5:
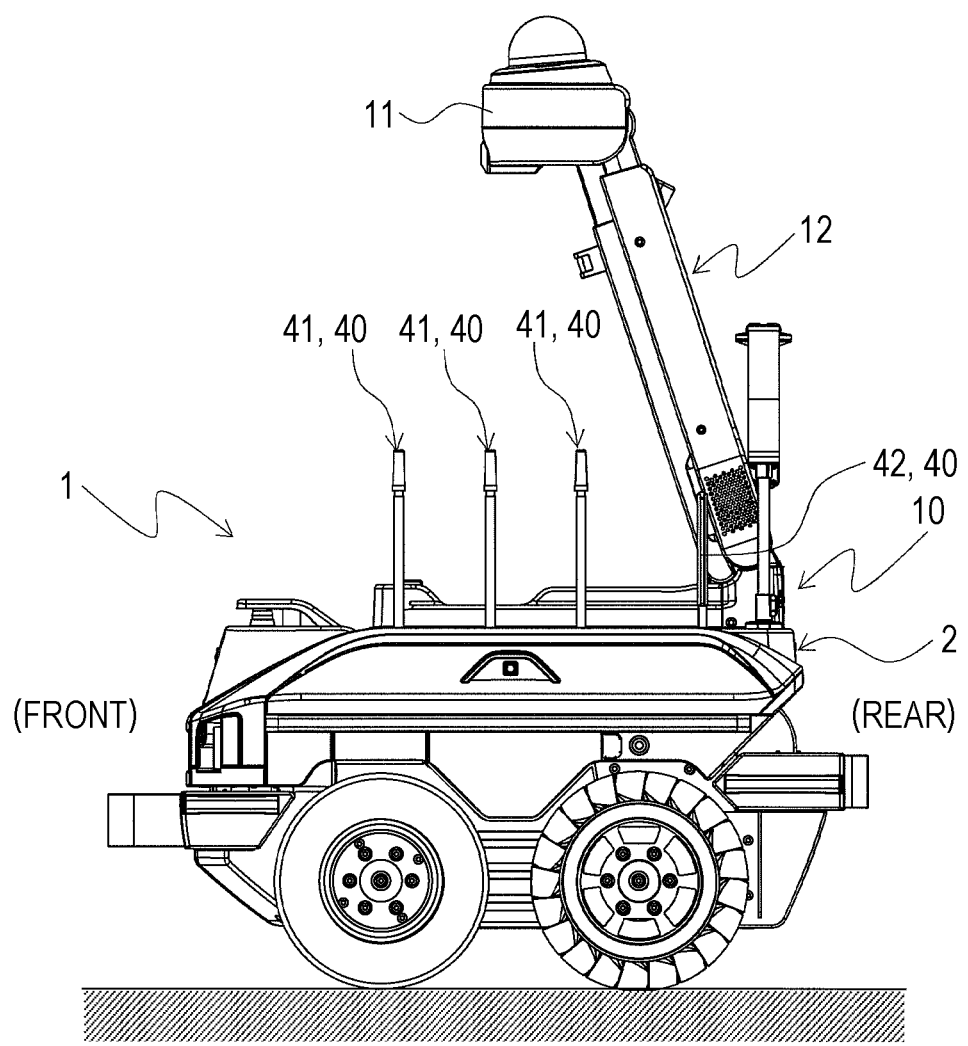
FIG. 5 is an illustration in side view that illustrates a positional relationship between the columnar antennas and an opening region in an elevation mechanism with the elevation apparatus raised in the autonomous travelling vehicle.

FIG. 4 is an illustration in plan view that illustrates installation positions of the columnar antennas on the autonomous travelling vehicle according to the first embodiment of the disclosure. FIG. 5 is an illustration in side view that illustrates a positional relationship between the columnar antennas and an opening region in the elevation mechanism with the elevation apparatus raised in the autonomous travelling vehicle.

The autonomous travelling vehicle 1 of the first embodiment includes the plurality of columnar antennas 40 stood adjacent to the area for the elevational motions of the elevation apparatus 10.

In the first embodiment, as illustrated in FIG. 1, Wi-Fi antennas 41 and cellular antennas 42 are provided as the columnar antennas 40 on the upper part of the chassis (vehicle body) 2.

The Wi-Fi antennas 41 that total six may be placed at specified intervals along a periphery of the elevation apparatus 10 with three placed in proximity of each lateral side of the elevation mechanism 12 in the width direction of the vehicle.

The Wi-Fi antennas 41 each may include an antenna unit 412 and a support unit 414 that supports the antenna unit 412. The support units 414 may detachably be attached to the upper part of the chassis 2.

As illustrated in FIG. 2, the Wi-Fi antennas 41 may be configured so that the antenna units 412 are placed at positions higher than a height of the elevation mechanism 12 lowered to a lowest position.

The cellular antennas 42 that total two may detachably be attached to positions on a rear part of the chassis 2 close to the drive unit 17 with one placed on each lateral side in the width direction of the vehicle.

As illustrated in FIGS. 2 and 5, the Wi-Fi antennas 41 and the cellular antennas 42 are placed at specified intervals (intervals that curb interference among the antennas) in positions facing side parts of the elevation mechanism 12. Thus an operator or the like is deterred by the Wi-Fi antennas 41 and the cellular antennas 42 from easily entering the area for the elevational motions of the elevation mechanism 12 when a raising operation of the elevation mechanism 12 is carried out in a direction in which the elevation unit 11 is raised as illustrated in FIG. 5.

According to the first embodiment configured as described above, the columnar Wi-Fi antennas 41 and cellular antennas 42 are stood adjacent to the area for the elevational motions of the elevation mechanism 12 in the elevation apparatus 10 in the autonomous travelling vehicle 1 provided with the elevation apparatus 10 on the vehicle body and thus the operator or the like can be deterred from entering the area for the elevational motions of the elevation mechanism 12 or inadvertently inserting fingers, a foreign object, or the like into the area when the elevation apparatus 10 is in an elevational motion. As a result, a catch of fingers, jamming of a foreign object, and the like can be curbed.

According to the first embodiment, sensitivity of the antennas can be increased by use of the columnar antennas 40 as the columnar members and by provision of the six Wi-Fi antennas 41 and the two cellular antennas 42 as the columnar antennas 40 along the periphery of the elevation apparatus 10.

In the first embodiment, the antenna units 412 of the Wi-Fi antennas 41 may be placed at the positions higher than the height of the elevation mechanism 12 with the elevation apparatus 10 lowered to the lowest position. When the autonomous travelling vehicle 1 travels with the elevation apparatus 10 lowered to the lowest position and fully closed, consequently, satisfactory reception status can be obtained with avoidance of reception interference with the antennas that might be caused by the elevation apparatus 10.

In the first embodiment, in which the Wi-Fi antennas 41 and the cellular antennas 42 can detachably be attached to the chassis 2, repair work and replacement work can be facilitated and the Wi-Fi antennas 41 and the cellular antennas 42 can be detached or attached as occasion demands upon travel or the like.

Second Embodiment

Subsequently, a second embodiment of the disclosure will be described with reference to drawings.

Figure 6:
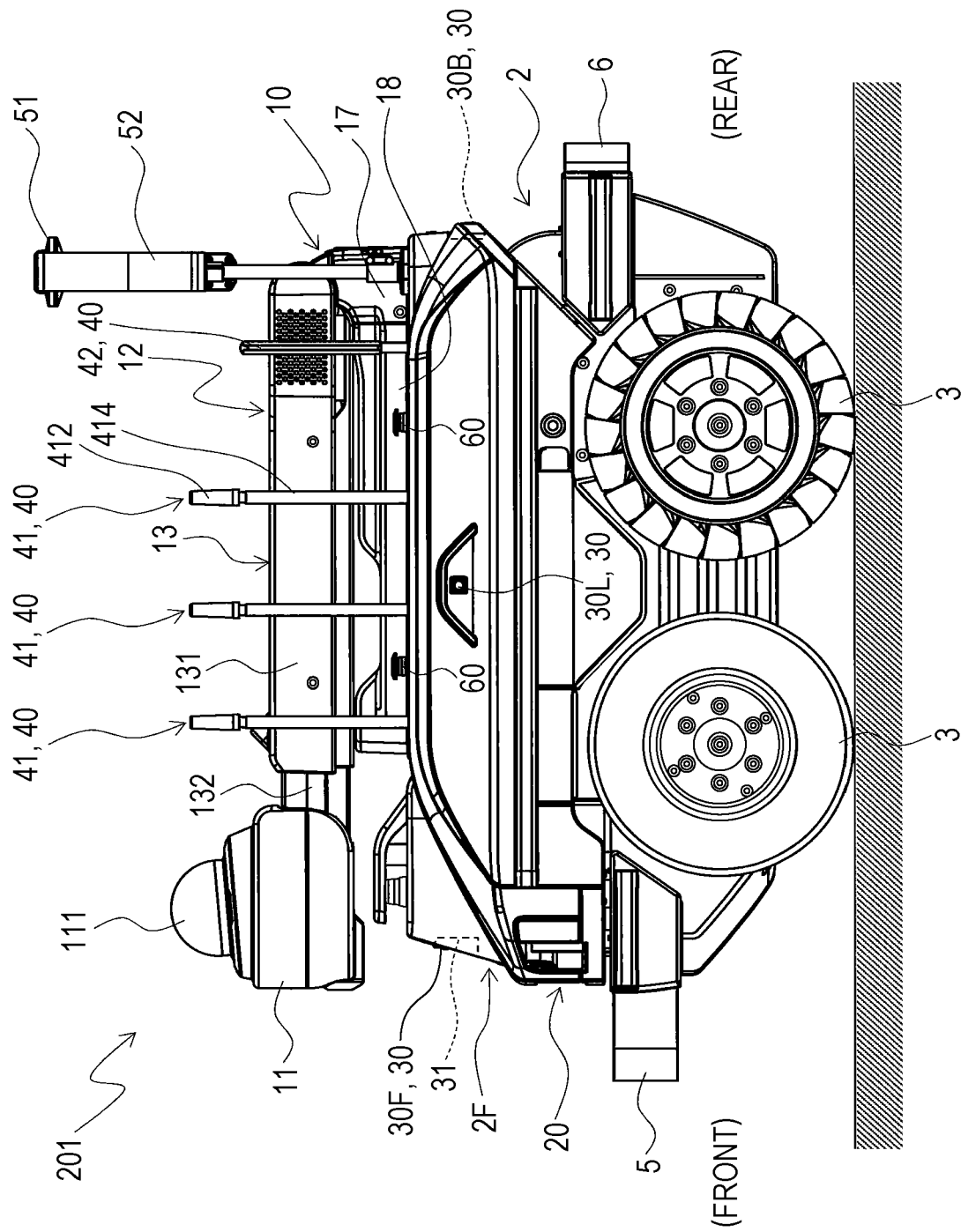
FIG. 6 is an illustration in side view that illustrates a general configuration of an autonomous travelling vehicle according to a second embodiment of the disclosure.
Figure 7:
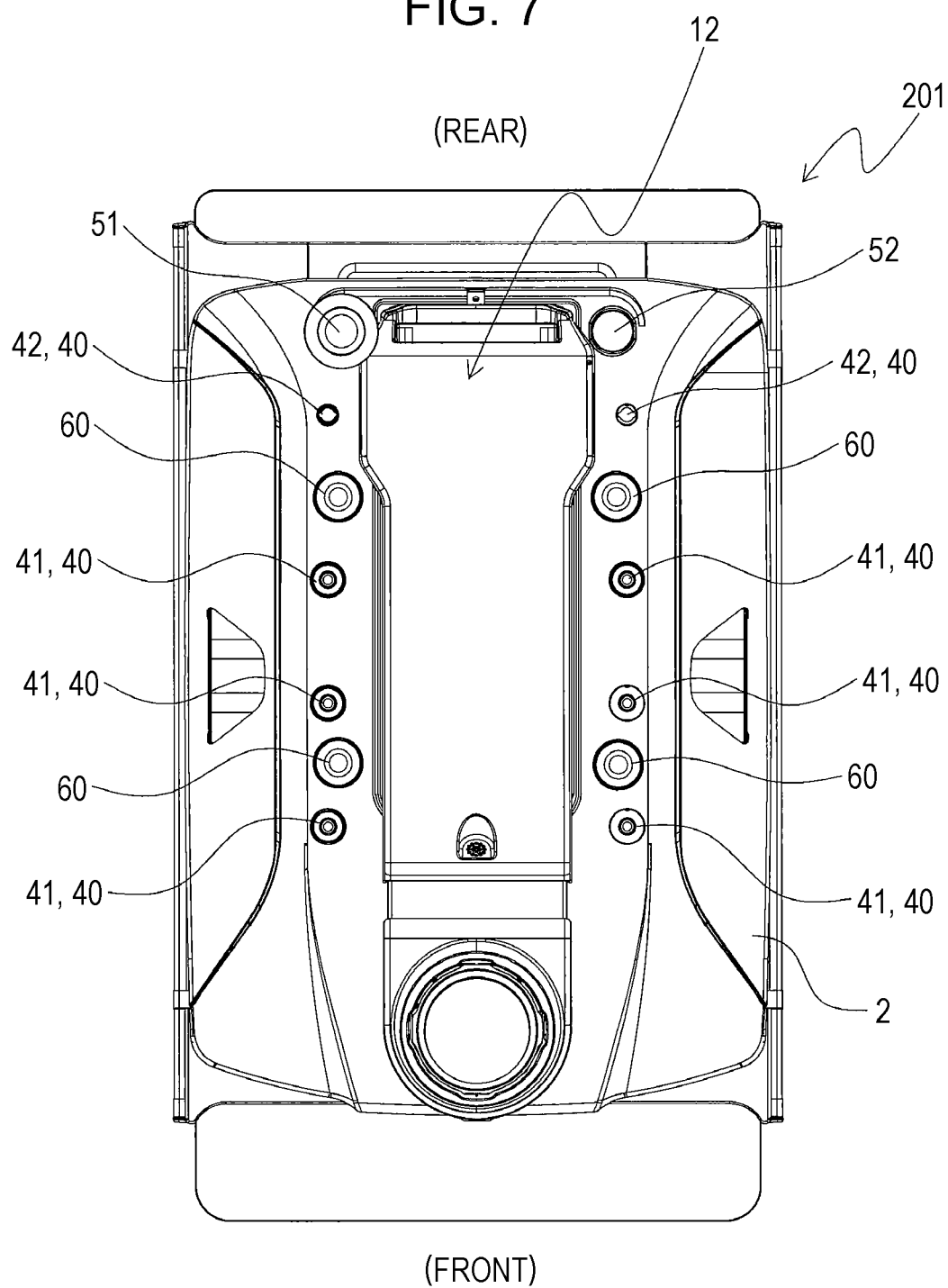
FIG. 7 is an illustration in plan view that illustrates installation positions of the columnar antennas and emergency stop buttons on the autonomous travelling vehicle.

FIG. 6 is an illustration in side view that illustrates a general configuration of an autonomous travelling vehicle according to the second embodiment of the disclosure. FIG. 7 is an illustration in plan view that illustrates installation positions of the columnar antennas and emergency stop buttons on the autonomous travelling vehicle.

Configurations of the autonomous travelling vehicle of the second embodiment that are similar to the configurations of the autonomous travelling vehicle of the first embodiment are provided with the same reference characters and description thereof is omitted.

As illustrated in FIGS. 6 and 7, the autonomous travelling vehicle 201 according to the second embodiment may include the emergency stop buttons 60 placed adjacent to the columnar antennas 40, in addition to the configurations of the first embodiment having the columnar antennas 40.

In the second embodiment, the emergency stop buttons 60 may be provided between the adjoining columnar antennas 40 on the upper part of the chassis 2 of the autonomous travelling vehicle 201.

As illustrated in FIG. 7, the plurality of emergency stop buttons 60 may be placed on the upper part of the chassis 2 so as to be similar in spacing from the side parts of the elevation mechanism 12 to the columnar antennas 40 in plan view and so as to be aligned with the columnar antennas 40.

In the second embodiment, as illustrated in FIG. 6 in side view, one of the emergency stop buttons 60 may be placed between the two Wi-Fi antennas 41 that are placed close to front of the elevation mechanism 12 and one of the emergency stop buttons 60 may be placed between the cellular antenna 42 and the Wi-Fi antenna 41 that are placed close to rear of the elevation mechanism 12.

According to the autonomous travelling vehicle 201 of the second embodiment configured as described above, the emergency stop buttons 60 may be placed adjacent to the columnar antennas 40 and thus the emergency stop buttons 60 can instantly be operated in case where an emergency occurs in proximity of the elevation apparatus 10.

In the second embodiment, the emergency stop buttons 60 may be placed between the columnar antennas 40 and thus the emergency stop buttons 60 can instantly be pressed in case where fingers are inserted through between the columnar antennas 40 into an opening between the elevation mechanism 12 and the base 18 and are about to get caught in the opening. As a result, a catch of an operator or the like between the elevation mechanism 12 and the base 18 can be avoided.

Third Embodiment

Subsequently, a third embodiment of the disclosure will be described with reference to drawings.

Figure 8:
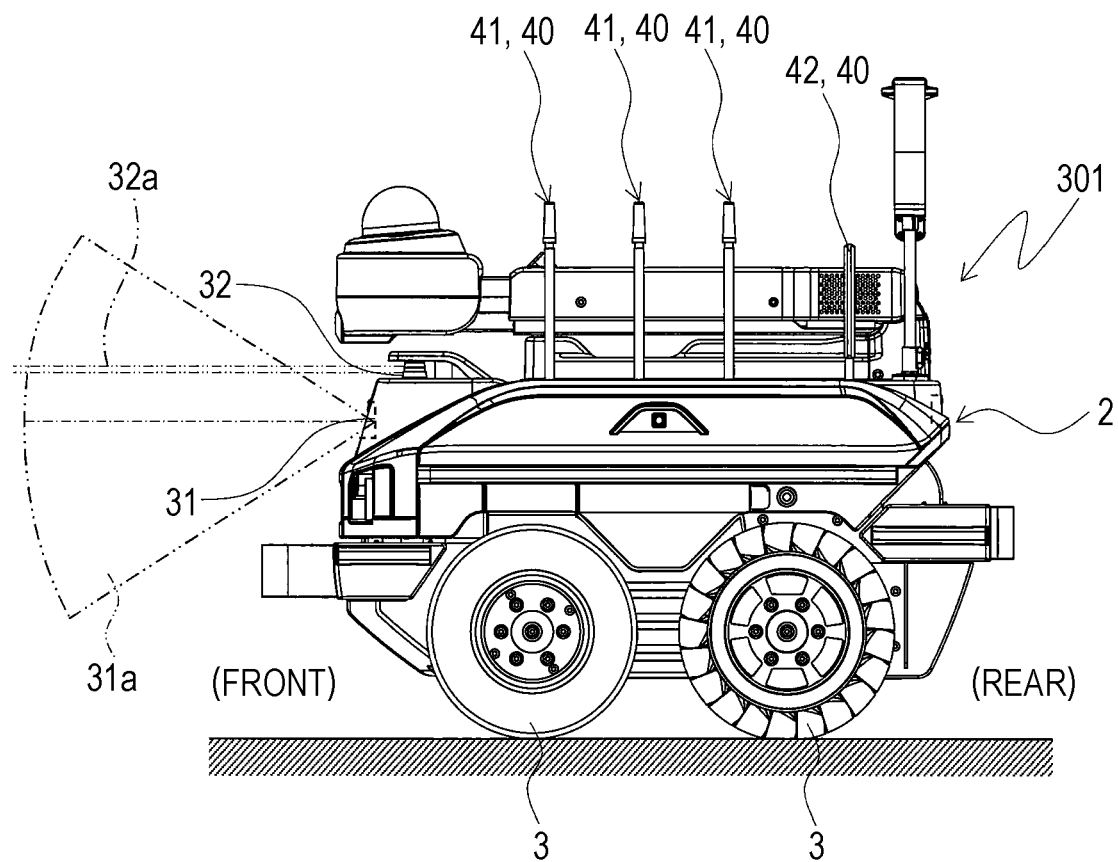
FIG. 8 is an illustration that illustrates detection regions in side view in front of the vehicle for distance sensors provided on an autonomous travelling vehicle according to a third embodiment of the disclosure.
Figure 9:
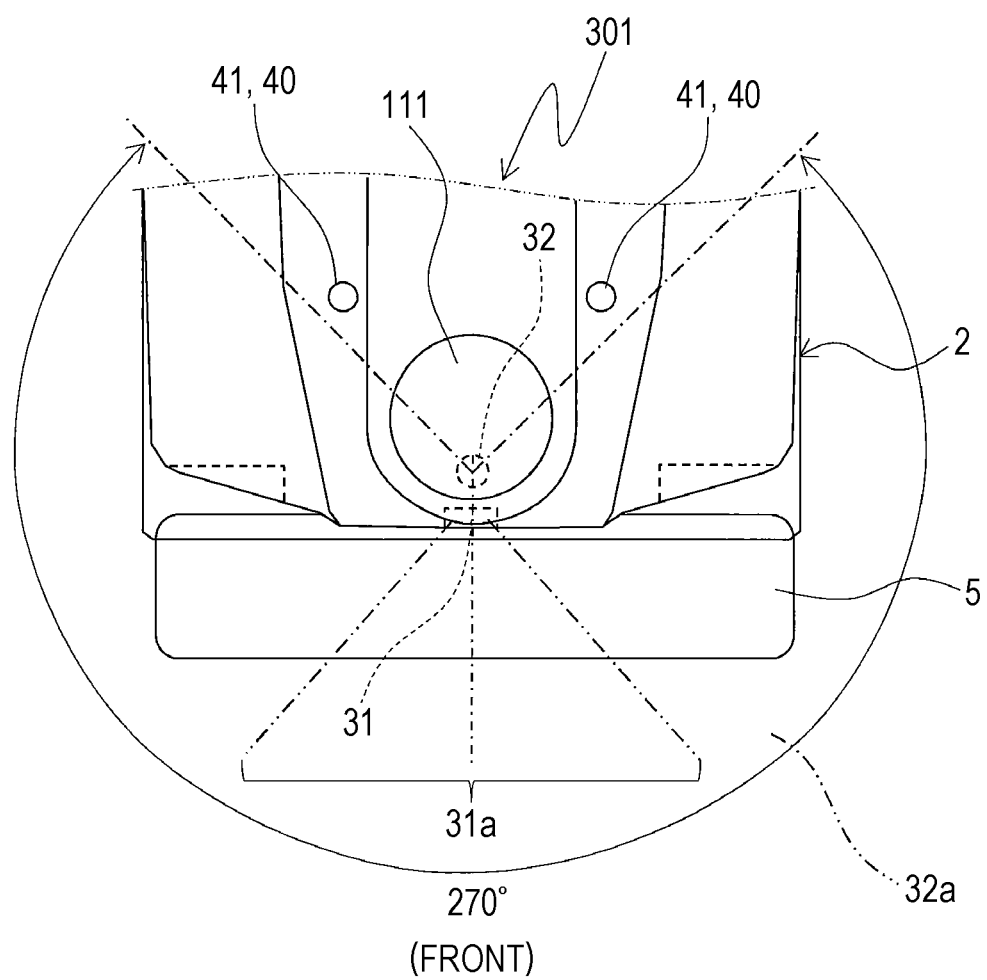
FIG. 9 is an illustration that illustrates the detection regions in plan view in front of the vehicle for the distance sensors provided on the autonomous travelling vehicle.

FIG. 8 is an illustration that illustrates detection regions in side view in front of the vehicle for distance sensors provided on an autonomous travelling vehicle according to the third embodiment of the disclosure. FIG. 9 is an illustration that illustrates the detection regions in plan view in front of the vehicle for the distance sensors provided on the autonomous travelling vehicle.

Configurations of the autonomous travelling vehicle of the third embodiment that are similar to the configurations of the autonomous travelling vehicle of the first embodiment are provided with the same reference characters and description thereof is omitted.

As illustrated in FIGS. 8 and 9, the autonomous travelling vehicle 301 according to the third embodiment may include a 2D distance sensor 32 provided as the distance sensor in addition to the LIDAR sensor 31 on the upper part on the front side of the chassis 2 and may have the columnar antennas 40 placed out of a detection range for the 2D distance sensor 32.

The LIDAR sensor 31 has the detection region 31*a* in which the detection is enabled within a specified vertical angle range as illustrated in FIG. 7 and in which the detection is enabled within a specified horizontal angle range as illustrated in FIG. 8.

The 2D distance sensor 32 has the detection region 32*a* in which detection is enabled within a specified vertical width as illustrated in FIG. 7 and in which the detection is enabled within a broad horizontal angle range of 270° spreading from the front to the rear as illustrated in FIG. 8.

The columnar antennas 40 may be placed at positions close to the detection region 32*a* for the 2D distance sensor 32 and out of the detection region 32*a*.

According to the autonomous travelling vehicle 301 of the third embodiment configured as described above, the 2D distance sensor 32 may be provided in addition to the LIDAR sensor 31 on the upper part on the front side of the chassis 2 and the columnar antennas 40 may be placed out of the detection region 32*a* for the 2D distance sensor 32, and thus the detection is enabled for an area from the front of the vehicle to proximity of the columnar antennas 40 close to the front without false recognition of the columnar antennas 40 as obstacles. Thus it can be detected that an operator or the like enters proximity of the area for the elevational motions of the elevation mechanism 12 from the front of the vehicle and occurrence of an emergency due to an entrance into the area for the elevational motions can be curbed.

Subsequently, a fourth embodiment of the disclosure will be described with reference to drawings.

Figure 10:
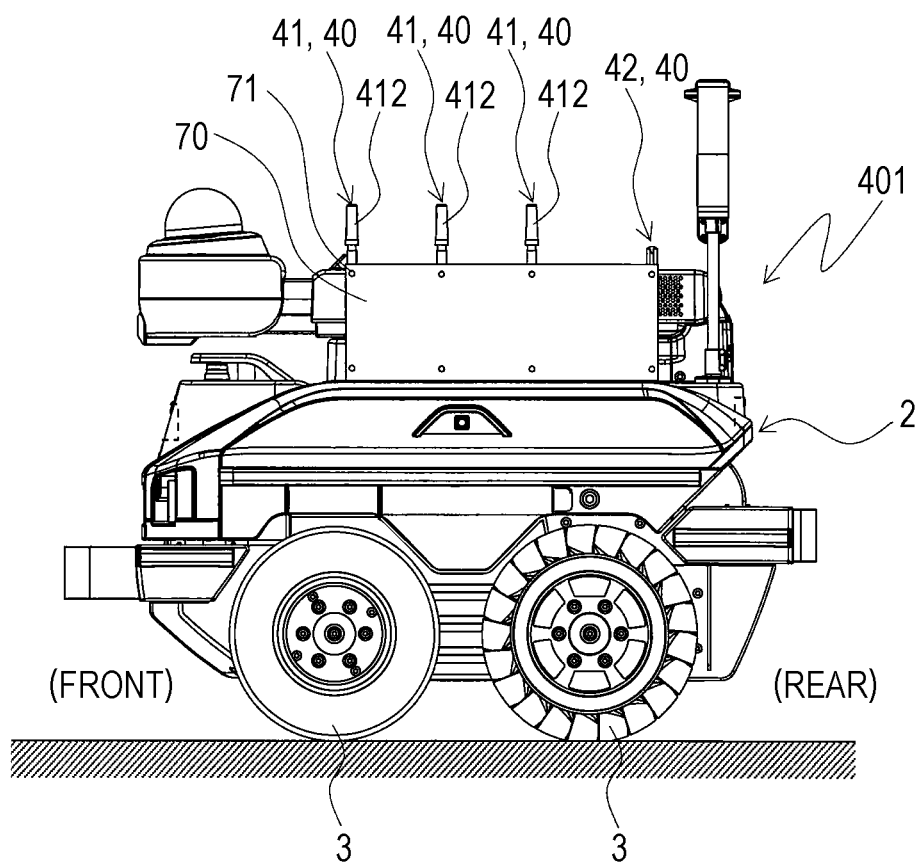
FIG. 10 is an illustration in side view that illustrates a configuration of a cover member for the elevation apparatus of an autonomous travelling vehicle according to a fourth embodiment of the disclosure.
Figure 11:
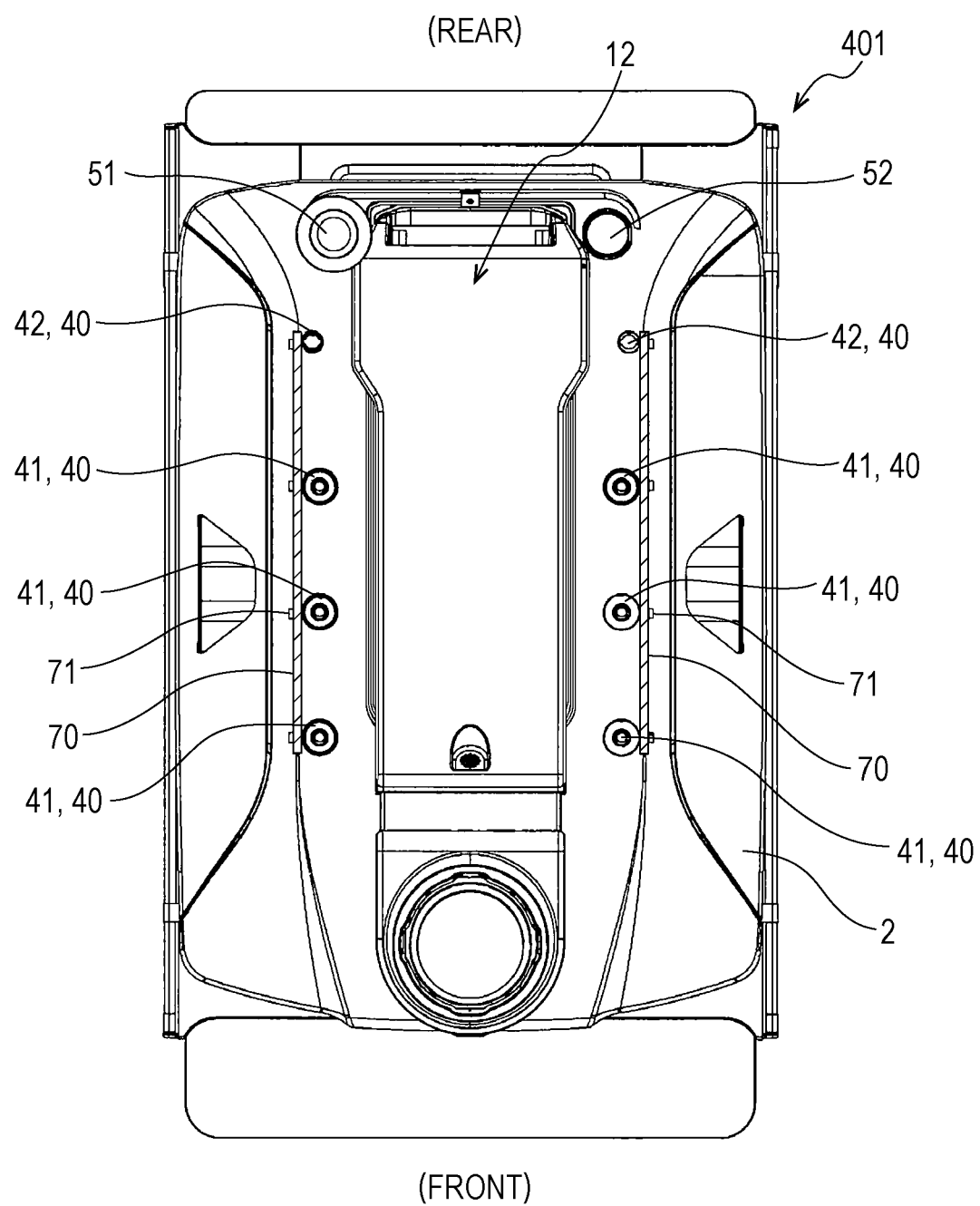
FIG. 11 is an illustration in plan view that illustrates the configuration of the cover member.

FIG. 10 is an illustration in side view that illustrates a configuration of a cover member for the elevation apparatus of an autonomous travelling vehicle according to the fourth embodiment of the disclosure. FIG. 11 is an illustration in plan view that illustrates the configuration of the cover member.

Configurations of the autonomous travelling vehicle of the fourth embodiment that are similar to the configurations of the autonomous travelling vehicle of the first embodiment are provided with the same reference characters and description thereof is omitted.

As illustrated in FIGS. 10 and 11, the autonomous travelling vehicle 401 according to the fourth embodiment includes the cover member 70 placed in a position facing the elevation apparatus 10 with use of the columnar antennas 40 placed on the upper part of the chassis 2 as supports.

The cover member 70 is made of a resin member, includes an area in which the columnar antennas 40 are placed, and is formed in a substantially rectangular shape with a height not exceeding the antenna unit 412 so as to extend from a front side to a rear side of the elevation apparatus 10.

The cover member 70 is detachably attached to the columnar antennas 40 with fastening members 71 such as bolts and screws.

According to the autonomous travelling vehicle 401 of the fourth embodiment configured as described above, the cover member 70 is placed in the position facing the elevation apparatus 10 with use of the columnar antennas 40 as the supports and thus an operator or the like can be blocked from entering the area for the elevational motions of the elevation mechanism 12 or inadvertently inserting fingers, a foreign object, or the like into the area.

In the fourth embodiment, the cover member 70 can detachably be attached with the fastening members 71 and thus can easily be detached for maintenance or the like of the elevation apparatus 10.

The disclosure is not limited to the embodiments described above and may be embodied with various modifications within the scope disclosed in the appended claims. That is, embodiments obtained by combination of technical measures modified appropriately within the scope disclosed in the appended claims are also encompassed by the technical scope of the disclosure.

The disclosure is not limited to the embodiments described above and may be embodied with various modifications within the scope disclosed in the appended claims. That is, embodiments obtained by combination of technical measures modified appropriately without departing from the purport of the disclosure are also encompassed by the technical scope of the disclosure.

The present disclosure contains subject matter related to that disclosed in Japanese Priority Patent Application JP 2016-092568 filed in the Japan Patent Office on May 2, 2016, the entire contents of which are hereby incorporated by reference.

What is claimed is:

1. An autonomous travelling vehicle comprising:
a vehicle body;
an elevation apparatus provided on an upper portion of the vehicle body; and
columnar antennas located directly adjacent to an area for elevational motions of the elevation apparatus, wherein
the columnar antennas are provided on the upper portion of the vehicle body and located outside of the area for elevational motions in a width direction of the vehicle body, and
the columnar antennas are located along a periphery of the elevation apparatus.

2. The autonomous travelling vehicle according to claim 1, wherein the columnar antennas are located in a proximity of both lateral sides of the elevation apparatus in the width direction of the vehicle.

3. An autonomous travelling vehicle comprising:
a vehicle body;
an elevation apparatus provided on an upper portion of the vehicle body;
columnar antennas located directly adjacent to an area for elevational motions of the elevation apparatus; and
an emergency stop button located adjacent to the columnar antennas, wherein
the columnar antennas are provided on the upper portion of the vehicle body and located outside of the area for elevational motions in a width direction of the vehicle body.

4. The autonomous travelling vehicle according to claim 1, wherein the columnar antennas are detachably attached to the vehicle body.

5. An autonomous travelling vehicle according to comprising:
a vehicle body;
an elevation apparatus provided on an upper portion of the vehicle body;
columnar antennas located directly adjacent to an area for elevational motions of the elevation apparatus; and
a distance sensor provided on a front side of the vehicle body, wherein
the columnar antennas are provided on the upper portion of the vehicle body and located outside of the area for elevational motions in a width direction of the vehicle body, and
the columnar antennas are located out of a detection range for the distance sensor.

6. An autonomous travelling vehicle according to comprising:
a vehicle body;
an elevation apparatus provided on an upper portion of the vehicle body; and
columnar antennas located directly adjacent to an area for elevational motions of the elevation apparatus, wherein
the columnar antennas are provided on the upper portion of the vehicle body and located outside of the area for elevational motions in a width direction of the vehicle body,
the columnar antennas each include an antenna unit and a support unit that supports the antenna unit, and
the antenna units are located at positions higher than a height of the elevation apparatus at a lowest position thereof.

7. An autonomous travelling vehicle comprising:
a vehicle body;
an elevation apparatus provided on an upper portion of the vehicle body; and
columnar antennas provided on the upper portion of the vehicle body, wherein
the elevation apparatus includes a first end portion and a second end portion, the first end portion being connected to the upper portion of the vehicle, and the second end portion being moved up and down by rotating the elevation apparatus along a longitudinal direction of the vehicle body with the first end portion as a fulcrum; and
the columnar antennas are located directly adjacent to an area for elevational motions of the elevation apparatus, the columnar antennas being provided on an area which overlaps with the area for the elevational motions when viewed from a lateral width direction of the vehicle body.

8. The autonomous travelling vehicle according to claim 7, wherein the columnar antennas are located along a periphery of the elevation apparatus.

9. The autonomous travelling vehicle according to claim 7, wherein the columnar antennas are located in a proximity of both lateral sides of the elevation apparatus in the lateral width direction of the vehicle.

10. The autonomous travelling vehicle according to claim 7, further comprising:
an emergency stop button placed adjacent to the columnar antennas.

11. The autonomous travelling vehicle according to claim 7, wherein the columnar antennas are detachably attached to the vehicle body.

12. The autonomous travelling vehicle according to claim 7, further comprising:
a distance sensor provided on a front side of the vehicle body, wherein
the columnar antennas are located out of a detection range for the distance sensor.

13. The autonomous travelling vehicle according to claim 7, wherein
the columnar antennas each include an antenna unit and a support unit that supports the antenna unit, and
the antenna units are located at positions higher than a height of the elevation apparatus at a lowest position thereof.

* * * * *